US010789096B2

(12) United States Patent
Lublin et al.

(10) Patent No.: US 10,789,096 B2
(45) Date of Patent: *Sep. 29, 2020

(54) CLIENT LIVE MIGRATION FOR A VIRTUAL MACHINE

(71) Applicant: Red Hat Israel, Ltd., Raanana (IL)

(72) Inventors: Uri Lublin, Raanana (IL); Roni Luxenberg, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,388

(22) Filed: Mar. 28, 2019

(65) Prior Publication Data

US 2019/0220307 A1    Jul. 18, 2019

Related U.S. Application Data

(63) Continuation of application No. 13/658,706, filed on Oct. 23, 2012, now Pat. No. 10,248,453.

(51) Int. Cl.
*G06F 15/173* (2006.01)
*G06F 9/48* (2006.01)
*H04L 29/06* (2006.01)
*H04L 29/08* (2006.01)

(52) U.S. Cl.
CPC ............ *G06F 9/4856* (2013.01); *H04L 29/06* (2013.01); *H04L 29/08072* (2013.01); *H04L 69/329* (2013.01); *H04L 63/20* (2013.01); *H04L 67/10* (2013.01)

(58) Field of Classification Search
CPC ... H04L 29/08072; H04L 29/06; H04L 67/10; H04L 67/04

USPC ......................... 709/203, 206, 220, 224, 228
See application file for complete search history.

(56) References Cited

U.S. PATENT DOCUMENTS

| 6,526,045 | B2 | 2/2003 | Yoshimoto et al. |
| 6,792,536 | B1 | 9/2004 | Teppler |
| 6,859,430 | B1 | 2/2005 | Frank et al. |
| 6,947,429 | B1 | 9/2005 | Heiss et al. |
| 7,529,784 | B2 * | 5/2009 | Kavuri .................. G06F 3/0605 |
| 7,809,667 | B1 | 10/2010 | Yehuda et al. |
| 8,098,245 | B2 | 1/2012 | Chen et al. |
| 8,190,670 | B2 | 5/2012 | Gavrilescu et al. |

(Continued)

OTHER PUBLICATIONS

Office Action Received for U.S. Appl. No. 13/658,706, dated Aug. 24, 2018, 8 pages.

(Continued)

*Primary Examiner* — Khanh Q Dinh
(74) *Attorney, Agent, or Firm* — Lowenstein Sandler LLP

(57) ABSTRACT

A second client device may be connected to a running virtual machine instance of a virtual machine while a first client device is connected to the running virtual machine instance. A first input data may be received from the first client device and a second input data may be received from the second client device. A determination may be made as to whether the second input data includes a great number of commands than the first input data in the time period. An output data associated with the running virtual machine instance may be generated by using the second input data in response determining that the second input data includes a greater number of commands than the first input data in the time period.

20 Claims, 7 Drawing Sheets

(56) References Cited

U.S. PATENT DOCUMENTS

| | | | |
|---|---|---|---|
| 8,250,357 B2 | 8/2012 | Sun et al. | |
| 8,302,170 B2 | 10/2012 | Kramer et al. | |
| 8,429,630 B2 | 4/2013 | Nickolov et al. | |
| 8,495,323 B1 | 7/2013 | Tatavarty | |
| 8,601,326 B1 | 12/2013 | Kim | |
| 8,635,351 B2 | 1/2014 | Astete et al. | |
| 8,843,926 B2 * | 9/2014 | Shaposhnik | G06F 21/57 718/1 |
| 8,869,144 B2 | 10/2014 | Pratt et al. | |
| 8,893,147 B2 | 11/2014 | Yin et al. | |
| 8,924,571 B2 | 12/2014 | Pratt et al. | |
| 8,977,679 B2 | 3/2015 | Van Biljon et al. | |
| 9,042,862 B2 * | 5/2015 | Rege | H04M 15/28 455/405 |
| 9,092,351 B2 | 7/2015 | Greiner et al. | |
| 9,110,700 B2 | 8/2015 | McKenzie et al. | |
| 9,210,100 B2 | 12/2015 | Van Der Linden et al. | |
| 9,507,615 B2 | 11/2016 | McKenzie et al. | |
| 9,544,752 B2 * | 1/2017 | Rege | H04M 15/28 |
| 9,842,072 B2 | 12/2017 | Farrow | |
| 9,960,637 B2 | 5/2018 | Sanders et al. | |
| 10,114,705 B1 | 10/2018 | Kumar et al. | |
| 10,140,147 B2 | 11/2018 | Stephens | |
| 10,147,076 B2 | 12/2018 | Zhou et al. | |
| 10,228,962 B2 * | 3/2019 | Dornemann | G06F 9/45558 |
| 10,248,453 B2 * | 4/2019 | Lublin | G06F 9/4856 |
| 2002/0152373 A1 | 10/2002 | Sun et al. | |
| 2003/0041106 A1 * | 2/2003 | Tuli | H04L 69/329 709/203 |
| 2004/0139208 A1 * | 7/2004 | Tuli | G06F 16/9577 709/230 |
| 2005/0091572 A1 | 4/2005 | Gavrilescu et al. | |
| 2006/0173997 A1 | 8/2006 | Tullberg et al. | |
| 2006/0291473 A1 | 12/2006 | Chase et al. | |
| 2007/0018043 A1 | 1/2007 | Lamoree et al. | |
| 2007/0103984 A1 | 5/2007 | Kavuri et al. | |
| 2007/0174429 A1 | 7/2007 | Mazzaferri et al. | |
| 2007/0180439 A1 | 8/2007 | Sundararajan et al. | |
| 2007/0263644 A1 | 11/2007 | Christie et al. | |
| 2008/0177994 A1 * | 7/2008 | Mayer | G06F 9/4418 713/2 |
| 2009/0036111 A1 * | 2/2009 | Danford | H04L 41/0893 455/419 |
| 2009/0063760 A1 * | 3/2009 | Weddle | G06F 13/1689 711/104 |
| 2009/0079612 A1 * | 3/2009 | Parfitt | G05B 19/054 341/157 |
| 2009/0083589 A1 * | 3/2009 | Fulton | G05B 19/05 714/48 |
| 2009/0276771 A1 * | 11/2009 | Nickolov | G06F 9/4856 717/177 |
| 2011/0145820 A1 | 6/2011 | Pratt et al. | |
| 2012/0015644 A1 * | 1/2012 | Danford | H04L 41/0893 455/419 |
| 2012/0192100 A1 | 7/2012 | Wang et al. | |
| 2012/0209935 A1 | 8/2012 | Harter et al. | |
| 2013/0282792 A1 * | 10/2013 | Graham | G06F 21/41 709/203 |

OTHER PUBLICATIONS

Office Action Received for U.S. Appl. No. 13/658,706, dated Jan. 25, 2018, 8 pages.
Office Action Received for U.S. Appl. No. 13/658,706, dated Mar. 7, 2017, 9 pages.
Office Action Received for U.S. Appl. No. 13/658,706, dated Aug. 24, 2016, 9 pages.
Office Action Received for U.S. Appl. No. 13/658,706, dated May 18, 2015, 9 pages.
Office Action Received for U.S. Appl. No. 13/658,706, dated Dec. 17, 2014, 8 pages.

* cited by examiner

CLIENT LIVE MIGRATION FOR A VIRTUAL MACHINE

RELATED APPLICATION

This continuation patent application claims priority to U.S. patent application Ser. No. 13/658,706 filed on Oct. 23, 2012, which is herein incorporated by reference.

TECHNICAL FIELD

The embodiments of the invention relate generally to virtual machine systems and, more specifically, to live migration of running instance of a virtual machine between client devices.

BACKGROUND

Client devices may establish connections to instances of virtual machines running on remote hosts. In some cases, a user may start an instance of a virtual machine with a first client device and may wish to continue use of that virtual machine instance from a different client device. However, typically in conventional virtualization systems in such a situation the user would disconnect from the virtual machine, causing the instance of that virtual machine to end. The user would then initiate creation of a new instance of that virtual machine from the second client device.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for a mechanism for migration of a running virtual machine instance between client devices. In one embodiment, a first client device of a user requests access to a virtual machine such as a virtual desktop. The first client device may be, for example, a mobile phone. A server connects the first client device to a running virtual machine instance. A second client device of the user then also requests access to the virtual machine. The second client device may be, for example, a desktop computer. The server connects the second client device to the virtual machine instance that the first client device is already connected to. After the second client device connects to the virtual machine instance, the server may disconnect the first client device or disable one or more functions associated with the first client device.

In a real world example, a user may connect to a virtual desktop provided by a server via his mobile phone. From the virtual desktop, he may initiate a video conference. This video conference may receive voice data from the mobile phone's microphone and may receive image data from a camera included in the mobile phone. During the video conference the user may arrive at work, and may turn on his desktop computer. From the desktop computer, he may connect to the virtual desktop. Once the desktop computer is connected to the virtual desktop, the server may begin receiving image data from a web cam attached to the desktop computer and voice data from a microphone connected to the desktop computer. The server may disconnect the mobile phone from the virtual desktop, and the user may continue his video conference from his desktop computer without any interruption having occurred. Note that the server may begin receiving data from the desktop computer and may disconnect the mobile phone responsive to a request from the mobile phone, a request from the desktop or a request from a third party such as a migration manager.

Note that embodiments of the present invention are discussed with reference to connection to a virtual machine. However, it should be noted that embodiments of the present invention may also be used to create connections for remote access to physical machines. For example, embodiments may enable migration of a connection to a running physical machine between client devices.

Figure 1:
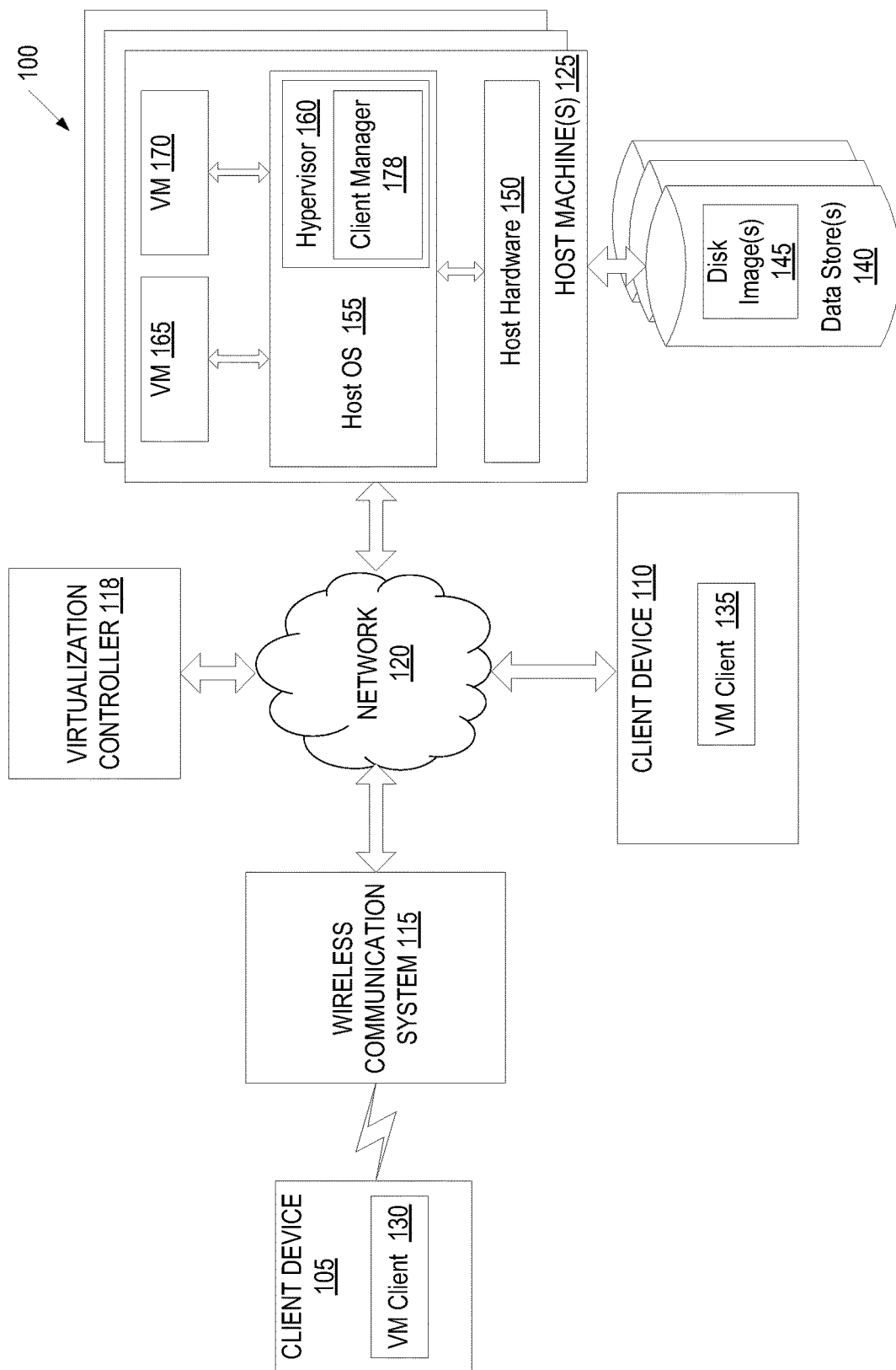
FIG. 1 is a block diagram of an example network architecture in which embodiments of the present invention may operate.

FIG. 1 illustrates an example network architecture 100 in which embodiments of the present invention may operate. The network architecture 100 includes one or more host machines 125 coupled to one or more client devices 105, 110 over a network 120. The network 120 may be a private network (e.g., a local area network (LAN), wide area network (WAN), intranet, etc.), a public network (e.g., the Internet), or a combination thereof. The host machines 125 may also be coupled to one or more data stores 140, which may be shared storage available to all of the host machines 125. The data stores may be network data stores such as a storage area network (SAN), network attached storage (NAS) or cloud based storage (e.g., storage as a service (SaaS)).

Each host machine 125 may be a rackmount server, a workstation, a desktop computer, a notebook computer, a tablet computer, a mobile phone, a palm-sized computing device, a personal digital assistant (PDA), etc. The host machines 125 include host hardware 150, which includes one or more processing devices, memory, and/or additional devices such as a graphics card, hardware RAID controller, network controller, hard disk drive, universal serial bus (USB) device, internal input/output (I/O) device, keyboard, mouse, speaker, etc.

Each host machine 125 may include a hypervisor 160 (also known as a virtual machine monitor (VMM)) that emulates the underlying hardware platform for the virtual machines 165, 170. In one embodiment, hypervisor 160 is a component of a host operating system (OS) 155. Alternatively, the hypervisor 160 may run on top of a host OS 155, or may run directly on host hardware without the use of a host OS.

The hypervisor 160 manages system resources, including access to memory, devices, storage devices (e.g., shared storage), and so on. The hypervisor 160, though typically implemented in software, may emulate and export a bare machine interface (host hardware) to higher level software. Such higher level software may comprise a standard or real-time operating system (OS), may be a highly stripped down operating environment with limited operating system functionality, may not include traditional OS facilities, etc. The hypervisor 135 presents to other software (i.e., "guest" software) the abstraction of one or more virtual machines (VMs) 165, 170, which may provide the same or different abstractions to various guest software (e.g., guest operating system, guest applications, etc.). Some examples of hypervisors include quick emulator (QEMU®), kernel mode virtual machine (KVM®), VMWare® Workstation, VirtualBox®, and Xen®.

Each host machine 125 hosts any number of virtual machines (VM) 165, 170 (e.g., a single VM, one hundred VMs, etc.). A virtual machine 165, 170 is a combination of guest software that uses an underlying emulation of the host machine 125 (e.g., as provided by hypervisor 160). The guest software may include a guest operating system, guest applications, guest device drivers, etc. Virtual machines 165, 170 can be, for example, hardware emulation, full virtualization, para-virtualization, and operating system-level virtualization virtual machines. The virtual machines 165, 170 may have the same or different guest operating systems, such as Microsoft® Windows®, Linux®, Solaris®, etc.

In one embodiment, each virtual machine 165, 170 hosts or maintains a desktop environment providing virtual desktops for remote clients 105, 110. A virtual desktop can represent an output (e.g., an image to be displayed) generated by a desktop application running within a virtual machine 165, 170. Graphics data associated with the virtual desktop can be captured and transmitted to a client 105, 110, where the virtual desktop may be rendered by a rendering agent and presented by a client application (e.g., VM client 130, 135). A virtual desktop may appear to a user of a client device as a standard desktop running on the client device 105, 110. It should be noted that functionality provided to clients such as client devices 105, 110 by virtual machines 165, 170 is not limited to virtual desktops and may include a wide variety of other server-based virtualization functions made available to the clients.

Each VM 165, 170 may be associated with a particular virtual disk image 145 or set of virtual disk images, each of which may be stored in a data store 140. These disk images 145 may appear to the virtual machine 165, 170 as a contiguous block device, which may have a file system installed thereon. The guest operating system, guest applications, user data, and so forth may be included in one or more of the disk images 145.

The clients devices 105, 110 may be any type of computing device such as a mobile phone, desktop computer, laptop computer, tablet computer, digital camera, and so forth. Some client devices (e.g., client device 105) may be thin clients, which serve as access terminals for users and depend primarily on the host machine 125 for processing activities. A thin client typically has limited processing and memory capacities. For example, a thin client may a netbook computer, cellular phone, personal digital assistant (PDA), tablet computer, etc. Some of the clients (e.g., client device 110) may be thick (fat) clients, which may have graphics processors, powerful CPUs and/or large memory. For example, a thick client may be a dual-core or multi-core computer, workstation, graphics workstation, etc.

The client devices 105, 110 may run client applications such as a Web browser and a graphic user interface (GUI).

In one embodiment, the client devices 105, 110 include virtual machine (VM) clients 130, 135. The VM clients 130, 135 may be configured to connect to and communicate with remotely hosted virtual machines (e.g., VMs 165, 170 hosted by host machines 125). The VM clients 130, 135 may receive and render output data such as video data and audio data from a VM 165, 170, and send input data such as keyboard commands, cursor commands, audio data from a microphone and video data from a camera to the VM 165, 170. In one embodiment, a VM 165, 170 communicates with VM client 130, 135 using a multichannel protocol (e.g., Remote Desktop Protocol (RDP™), Simple Protocol for Independent Computing Environments (SPICE™ from Red Hat™, etc.) that allows for connection between VM 165, 170 and client device 105, 110 via individual channels. In some embodiments, VM clients 130, 135 include a remote rendering agent and/or a remote connection protocol agent that are implemented to improve end-user experience of a virtual desktop system. In particular, a remote rendering agent and/or a remote connection protocol agent may work in tandem with the host machine 125 and the VM 165, 170 to determine the most efficient place to process graphics to maximize an end user experience and minimize system load. VMs 165, 170 may maintain connections with the remote rendering agent and/or the remote connection protocol agent via individual channels. In one embodiment, VM clients 130, 135 are standard web browser applications. Alternatively, VM clients 130, 135 may be standalone applications configured specifically for interfacing with virtual machines such as virtual desktops.

Some client devices such as client device 105 may be connected to the network 120 via a wireless communication system 115. The wireless communication system 115 may be a wireless fidelity (WiFi) hotspot connected with the network 120. Wireless communication system 115 may alternatively be a wireless carrier system (e.g., as provided by Verizon®, AT&T®, T-Mobile®, etc.) that can be implemented using various data processing equipment, communication towers, etc. The wireless communication system may permit mobile client devices (e.g., client device 105) to remain connected to the network 120 (and thus to virtual machines 165, 170) while moving around, without being tethered to the network 120.

Each virtual machine 165, 170 can be accessed by one or more of the clients 105, 110 over the network 120. Each virtual machine 165, 170 executes operations for a client. In one scenario, each virtual machine 165, 170 provides a virtual desktop for the client 105, 110 and executes some or all of the graphics operations relating to the virtual desktop. Each client device 105 may have one or more client-side resources. Client-side resources may include end user devices such as an input/output (I/O) device (e.g., a display, a keyboard, a mouse), a USB device, or a storage device, etc. The hypervisor 160 may include a virtual device for each end user device to allow VM access to control and management functions of the client device 105, 110. The hypervisor 160 may expose virtual devices to the VMs 165, 170, and the VMs 165, 170 contain device drivers to access the virtual devices.

The hosts 125 can be managed by a virtualization controller 118. The virtualization controller 118 may be a computing device coupled to the host machines 125 directly or via a network 120. Alternatively, the virtualization controller 118 may be included in one of the hosts 125 (e.g., may be a component of a hypervisor). The virtualization controller 118 may add a virtual machine, delete a virtual machine, balance the load on the host machines 125, power on/off host machines 125, provide directory service to the virtual machines 165, 170, and perform other managerial functions.

A client device 105, 110 may request access to a virtual machine 165, 170. In one embodiment, VM client 130, 135 sends such a request to virtualization controller 118. Virtualization controller 118 may then determine an appropriate host machine 125 to host the requested virtual machine 165, 170, and may instruct a hypervisor 160 running on the selected host machine 125 to load the requested virtual machine 165, 170 from an associated disk image 145. The hypervisor 160 may load the virtual machine 165, 170, thus establishing a virtual machine instance. Alternatively, an appropriate virtual machine instance may already be running. Once the instance for the virtual machine 165, 170 has been established, virtualization controller 118 may notify the client device 105, 110 of an address for the virtual machine 165. The client device 105, 110 may then connect to the VM 165, 170 using the provided address.

While a first client device is connected to a running instance of a virtual machine, a second client device may request access to that same virtual machine. The second client device may be another device of a same user of the first client device, or may be a user device associated with a different user account that has permission to access the VM instance. Virtualization controller 118 may detect that the two client devices are associated with the same user (e.g., based on authentication credentials such as a login and password provided by both client devices). Virtualization controller 118 may then notify the second client device of the address for the virtual machine instance. The second client device may then connect to the virtual machine instance using the provided address.

When the hypervisor 160 detects that two client devices have connected to the same virtual machine, hypervisor 160 may delegate control of those connections to a client manager 178. In one embodiment, as shown, the client manager 178 is a component of hypervisor 160. Alternatively, client manager 178 may be a separate module, which may run on host OS 155 or within the VM itself 165, 170. Client manager 178 is discussed in greater detail below with reference to FIG. 2.

Figure 2:
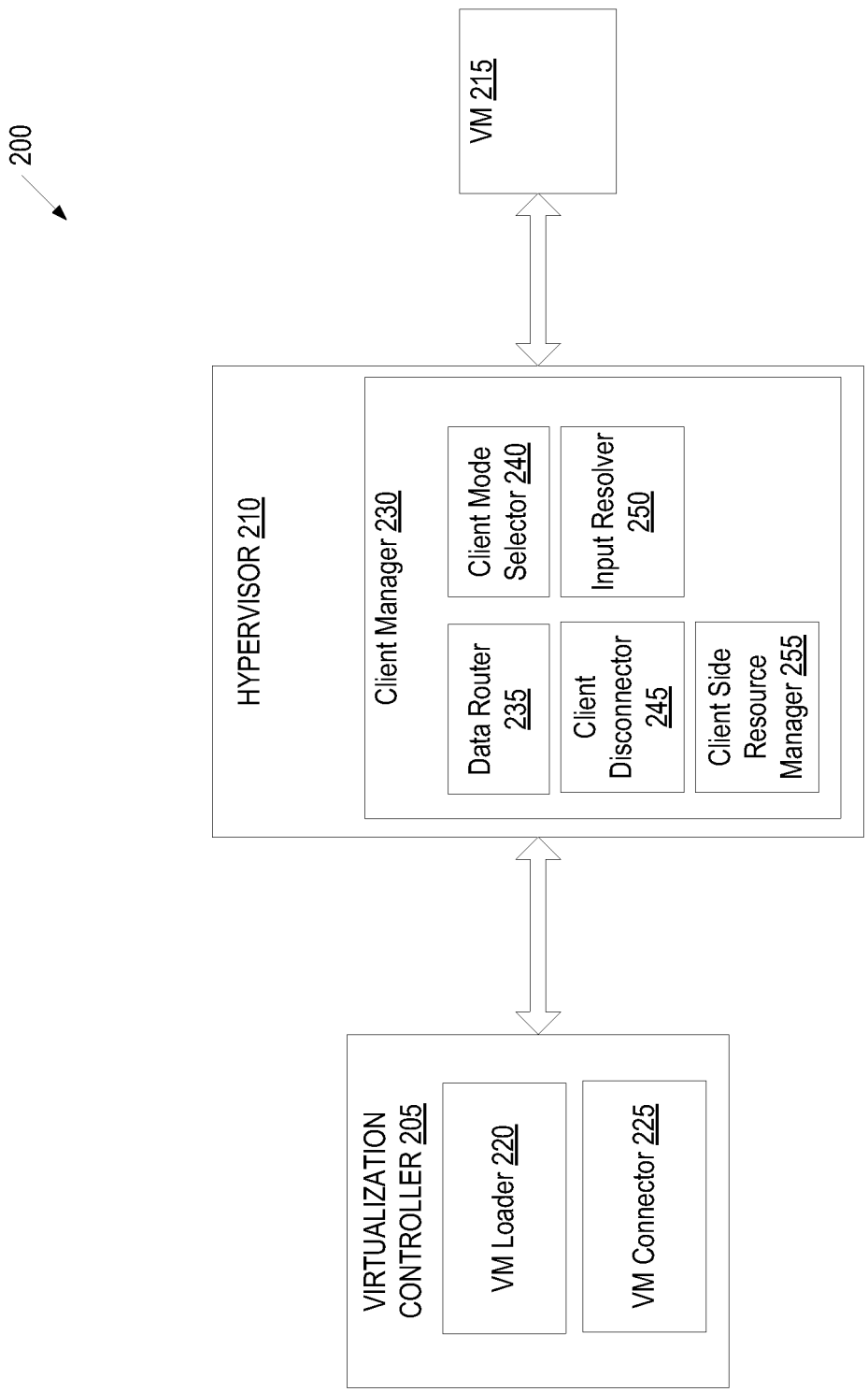
FIG. 2 is a block diagram of a virtualization system that can perform live migration of virtual machine instances between client devices.

FIG. 2 is a block diagram of a virtualization system 200 that can perform live migration of virtual machine instances between client devices. The virtualization system 200 includes a virtualization controller 205, a hypervisor 210 and a virtual machine 215. Virtualization controller 205 may receive a request from a client device for access to a virtual machine 215. The request may be for a specific virtual machine, and may be accompanied by user credentials such as a login and password. Alternatively, the client device may have previously logged in to the virtualization controller 205, and thus may not include credentials with the request.

In response to the request for the VM 215, virtualization controller 205 may determine if an instance of the VM 215 is already running. If no instance for the VM 215 has been established, virtual machine (VM) loader 220 may determine an appropriate host machine to host the VM 215 and instruct a hypervisor 210 on that host machine to start an instance of that VM 215 (e.g., to load the VM). The hypervisor 210 may establish an instance of the VM 215, and may send an address for the VM 215 to the virtualization controller 205. A VM connector 225 of the virtualization controller 205 may then notify the client device of the address to the VM 215. If an instance of the VM 215 has already been established, VM connector 225 may report an address of that running VM instance to the client device. The client device may connect to the VM 215 using the supplied address.

After the client device connects to the virtual machine 215, a second client device may request access to the same virtual machine 215. The second device may also provide credentials to authenticate itself to the virtualization controller 205. If the provided credentials match those that were provided by the first client device (or a sharing policy otherwise permits sharing of the VM instance), virtualization controller 205 may determine that the second client device should be connected to the same VM instance that the original client device is connected to. Accordingly, VM connector 225 may provide the second client device with an address of the VM 215. The second client device may then connect to the VM 215 using the provided address. Note that though the virtualization controller 205 has been described as making a determination regarding whether to connect the second device to the running VM 215, other devices may make this determination as well. For example, the user may issue a command from the first client device or the second client device to connect the second client device to the VM instance.

Hypervisor 210 may include a client manager 230, which may manage interactions with clients when multiple client devices connect to the same virtual machine 215. In one embodiment, client manager 230 includes a data router 235, a client mode selector 240, a client disconnector 245, an input resolver 250 and a client side resource manager 255. In alternative embodiments, the client manger 230 (or modules illustrated as being components of the client manager 230) may reside outside of the hypervisor 210.

In one embodiment, client mode selector 240 places any subsequent client devices that connect to a VM 215 after a first client device into a secondary mode. The secondary mode is an "observe only" mode in which the client device in the secondary mode receives some or all data output by the VM (e.g., graphics data for rendering, audio data, etc.), but is not allowed to input any data to control the VM 215. At any time a user of the multiple client devices may select a different client device to be a primary device (e.g., by selecting a menu option or pressing a particular key sequence). The selection may be made from any of the connected client devices, or alternatively may be made only from the first client device or from particular client devices associated with user accounts identified in a sharing policy. In response to the selection of a new primary client, client mode selector 240 may grant the selected client device a primary mode status, and change the status of the client device that was previously in the primary mode into the secondary mode.

In one embodiment, multiple client devices may be placed in a primary mode (also referred to as a standard mode). Accordingly, each of the client devices may both input data to the VM 215 and receive output data from the VM 215. In such an embodiment, input resolver 250 may receive all inputs from clients, and then resolve any conflicts between those inputs. For example, if two client devices send contradictory mouse commands, input resolver may select one of the mouse commands for forwarding to the VM 215. Input resolver 250 may include a set of heuristics that enable input resolver to identify which inputs are most likely to reflect a user's actual intended outcome. For example, input resolver 250 may select commands from a client device that sent a greater number of commands in a particular time frame. Input resolver 250 may also analyze commands for randomness to determine if they are likely unintended inputs (e.g., from a phone in a user's pocket). In the case of video and audio input data, input resolver 250 may analyze a quality of input data from both client devices, and send to the VM 215 the highest quality data.

Each client device may have one or more client side resources that may be used by the virtual machine 215. For example, a client device may include a microphone, a display, a video camera, storage (e.g., an attached universal serial bus (USB) drive), and so forth. When a client connects to the virtual machine 215, as part of the connection process that client may report its client side resources to the virtual machine 215. The virtual machine may then mount those client side resources within the virtual machine (e.g., may map device drivers to each of the client side resources). Accordingly, if two client devices are connected to the VM 215, the VM may use, for example, a microphone of a first client device, and a camera and display of a second client device. Client side resource manager 255 may select which resources from which client devices to connect to the virtual machine. This decision may be a dynamic decision that gets updated as conditions change. For example, client side resource manager 255 may initially connect a display, video camera and microphone from a first client device to the virtual machine. Later, when a second client device connects to the virtual machine, client side resource manager 255 may disconnect and/or disable the microphone and video camera from the first client device and replace it with a connection to a microphone and video camera of the second client device.

Client manager 230 may present to the virtual machine 215 a single logical client. Accordingly, VM 215 may be unaware that it is actually communicating with two or more different client devices. VM 215 may receive input data from the logical client (which may have been processed by input resolver 250), and send output data to the logical client. Data router 235 may process such output data, and determine which client devices the output data should be sent to. For example, if a particular client device does not have a registered speaker client side resource, then data router 235 may not send audio output data to that client. The logical client may also switch between peripheral devices of different client devices. For example, the logical client may connect a first camera of a first client device to the virtual machine initially, and may later disconnect the first camera and connect a second camera of a second client device to the virtual machine.

In one embodiment, client disconnector 245 disconnects a first client device after a second client device successfully connects to the virtual machine 215. In response to the disconnection of the first client device, client mode selector 240 may place the second client device into a primary mode. Alternatively, client mode selector 240 may place the second client device into the primary mode before disconnecting the first client device. Thus, the running virtual machine instance may be live migrated from the first client device to the second client device.

Figure 3:
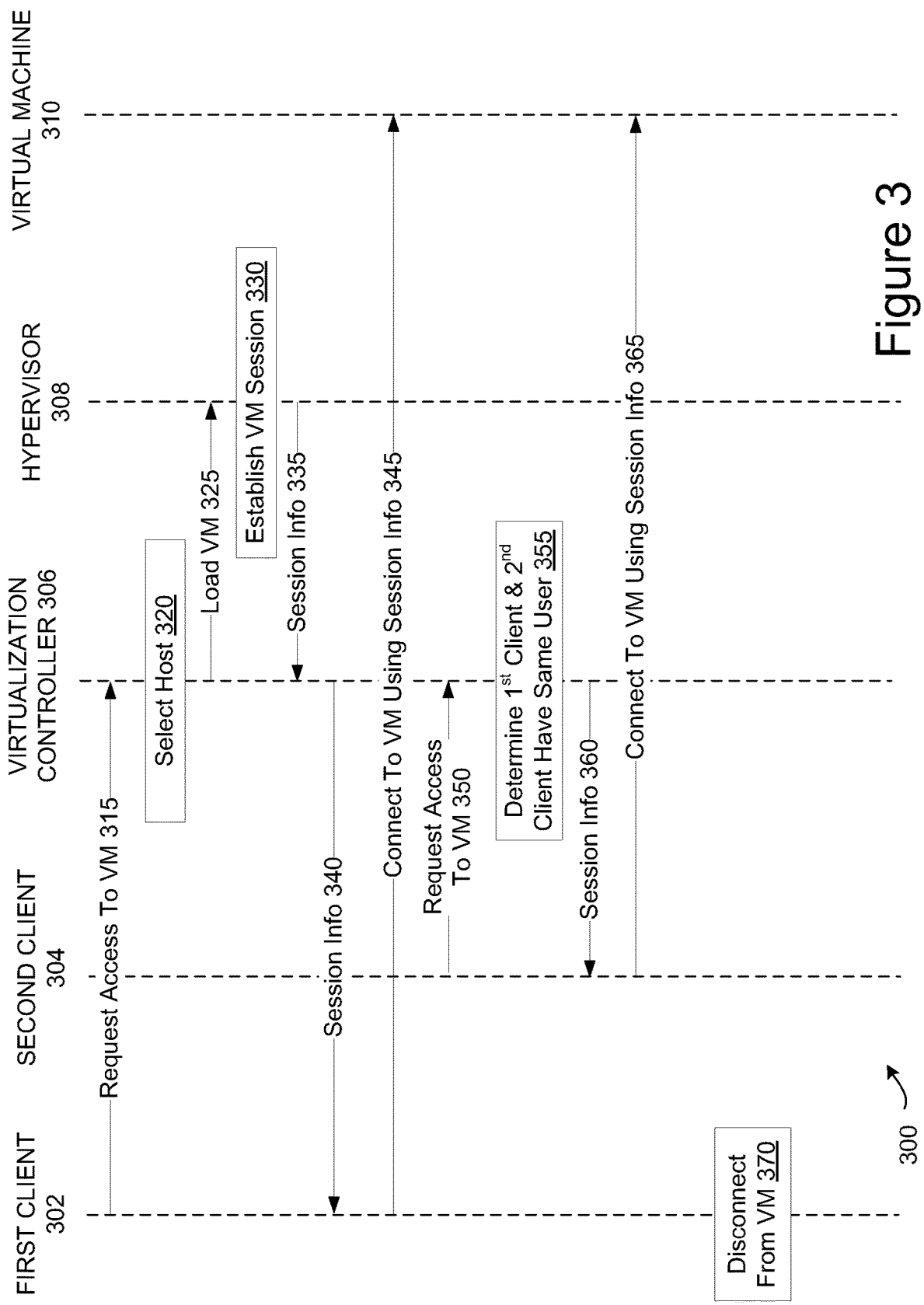
FIG. 3 is a sequence diagram showing live migration of a running virtual machine instance between two client devices.

FIG. 3 is a sequence diagram 300 showing live migration of a running virtual machine instance between two client devices. The sequence diagram 300 shows a first client 302, second client 304, virtualization controller 306, hypervisor 308 and virtual machine 310 in communication. At block 315, a first client 302 sends a request for access to a VM to the virtualization controller 306. At block 320, the virtualization controller 306 selects a host to host the VM. At block 325, the virtualization controller 306 instructs the hypervisor 308 of a particular host to load the VM. At block 330, the hypervisor 308 establishes an instance of the virtual machine. The hypervisor 308 then reports information for the instance (e.g., an address of the VM) to the virtualization controller 306 at block 335. At block 340, the virtualization controller forwards the information to the first client 302. The first client 302 then connects to the instance of the virtual machine 310 using the information at block 345.

Note that in alternative embodiments the VM may already have been loaded prior to receiving the access request. In such an embodiment, the virtualization controller 306 may select a previously loaded VM for the first client 302. The virtualization controller 306 may then forward information for the previously loaded VM to the first client 302.

At block 350, a second client 304 sends a request for access to the VM to the virtualization controller 306. At block 355, the virtualization controller 306 determines that the first client and the second client have the same user or that a sharing policy permits sharing of the VM instance between different users. Accordingly, the virtualization controller determines to connect the second client to the previously established instance of the virtual machine 310. In one embodiment, the virtualization controller 306 informs the hypervisor (or the first client device) that another client device is going to connect. This notice may be accompanied by credentials associated with the second client device. This may enable the hypervisor to enforce the sharing policy. At block 360, the virtualization controller 306 sends the information for the virtual machine 310 to the second client 304.

Note that the first client 304 may send information for the virtual machine 310 to the second client instead of, or in addition to, the virtualization controller 306 sending information to the second client 304. In one embodiment, the first client 302 and second client 304 exchange information that facilitates the live migration of the virtual machine instance between the clients. Such information may include, for example, client side data such as settings and configuration data for an agent running on the client that interacts with the virtual machine instance.

The second client 304 then connects to the virtual machine 310 using the information at block 365. The first client may then disconnect from the virtual machine at block 370. Accordingly, the running instance of the virtual machine 310 has been live migrated from the first client device 302 to the second client device 304 without any interruption in the VM instance.

Figure 4:
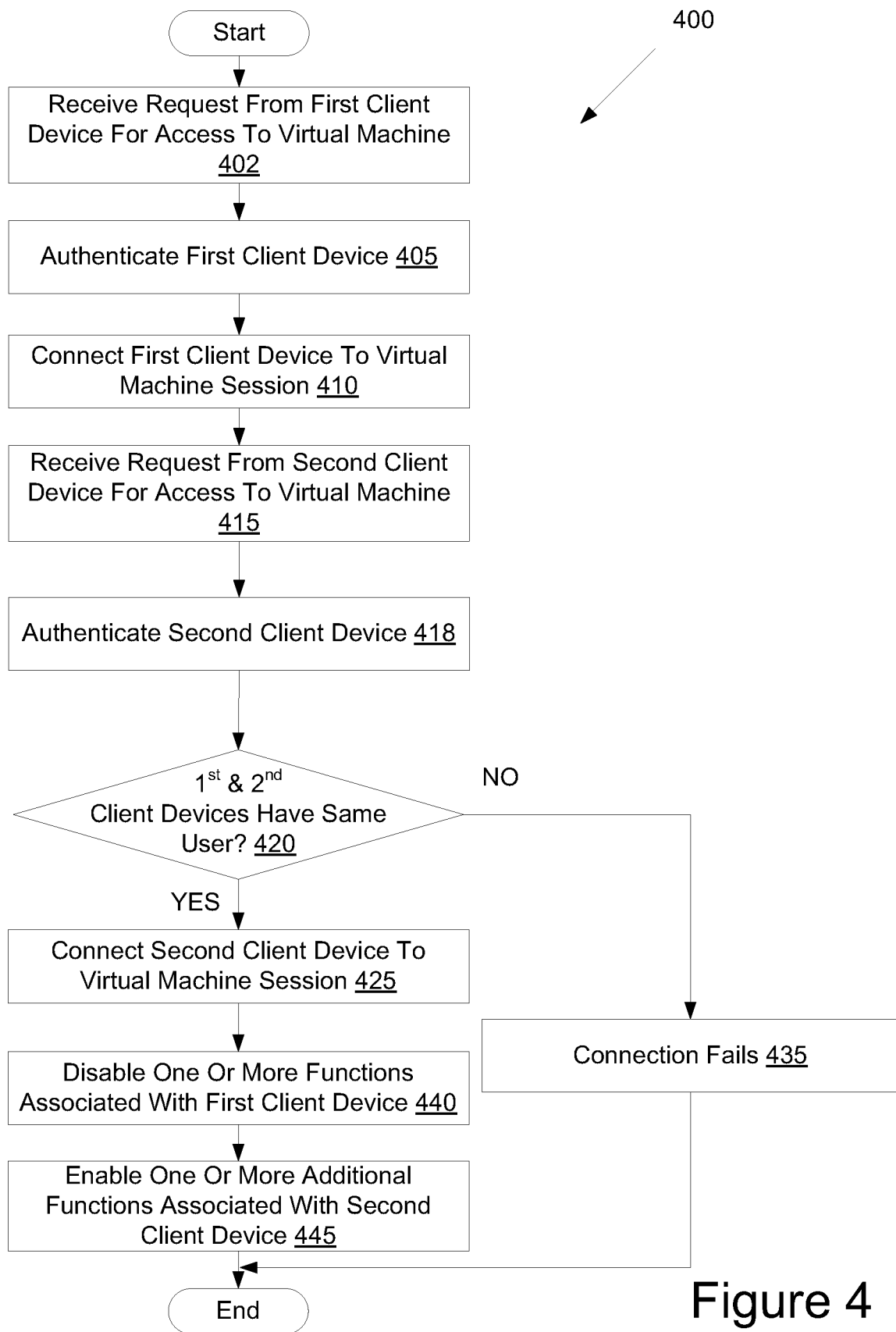
FIG. 4 is a flow diagram illustrating a method for connecting two client devices to a single virtual machine instance.
Figure 5:
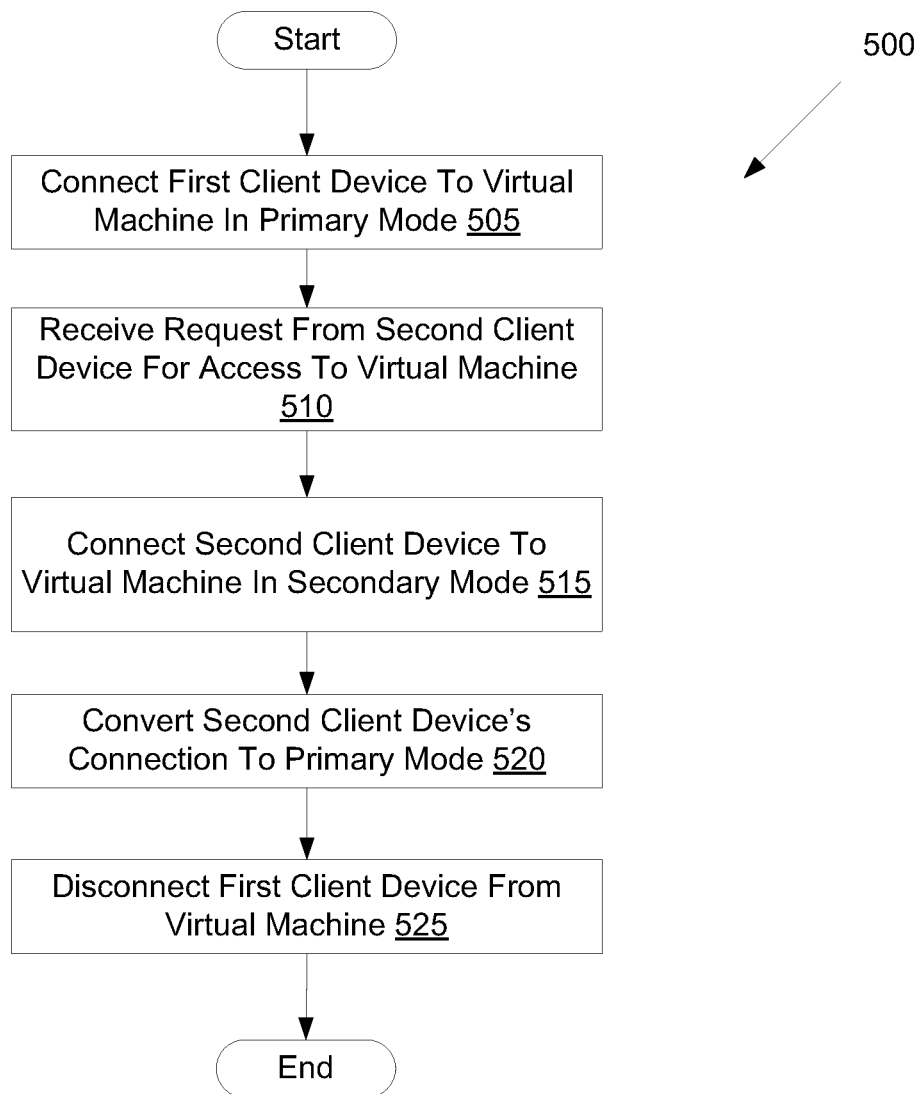
FIG. 5 is a flow diagram illustrating a method for live migrating a virtual machine instance between client devices.
Figure 6:
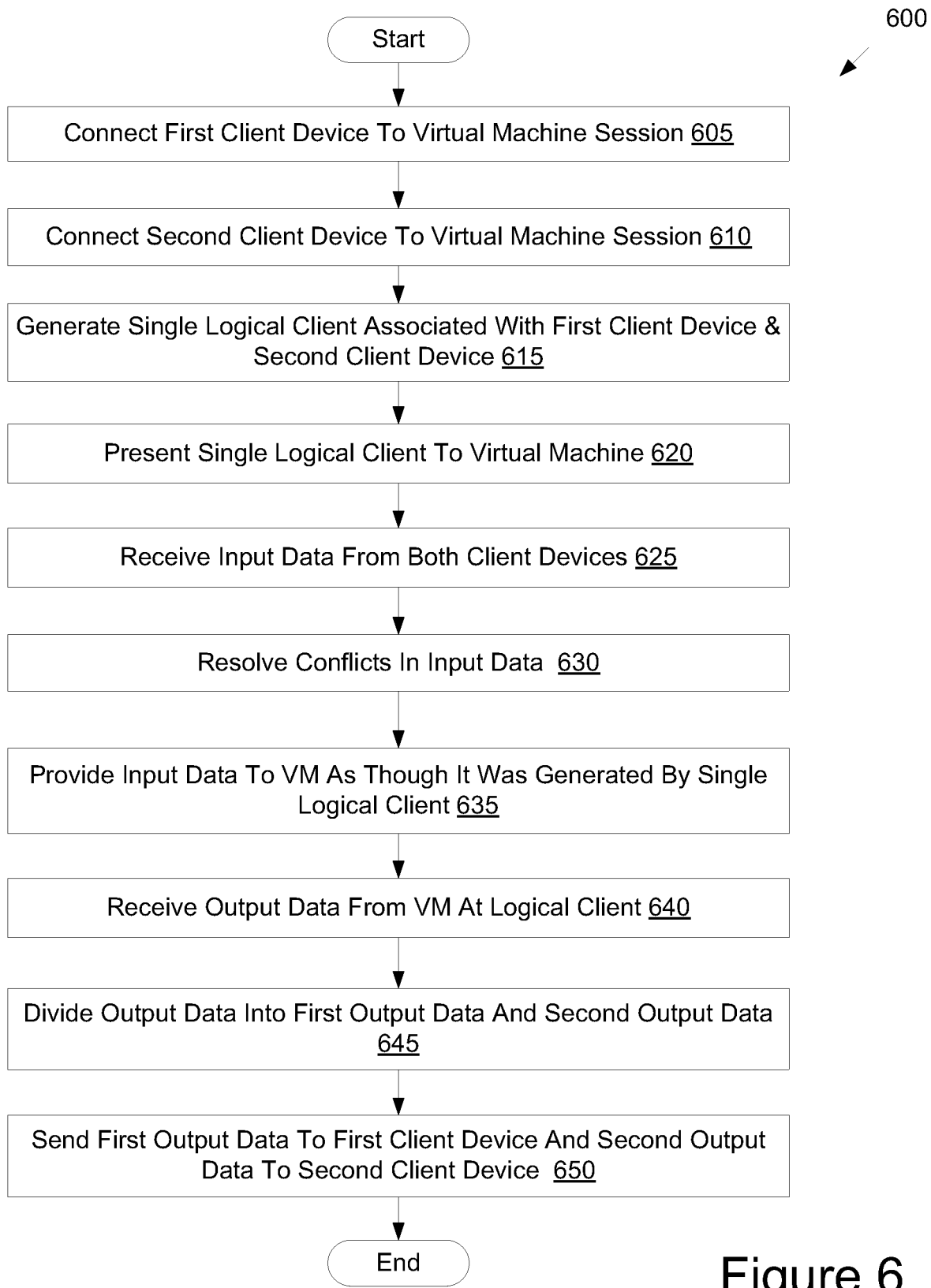
FIG. 6 is a flow diagram illustrating a method for managing a logical client that connects to two client devices.

FIGS. 4-6 are flow diagrams showing various methods for live migrating an instance of a virtual machine between client devices and/or for connecting multiple client devices to a single instance of a virtual machine. The methods may be performed by a computer system that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a virtualization controller 205 and/or a client manager 230 of FIG. 2.

FIG. 4 is a flow diagram illustrating a method 400 for connecting two client device to a single virtual machine instance. At block 402 of method 400, processing logic receives a request from a first client device for access to a virtual machine. At block 405, processing logic authenticates the first client device. In one embodiment, a user of the first client device provides credentials such as a login and password. These credentials may be used to authenticate the first client device and associate it with a first user account.

At block 410, processing logic connects the first client device to a previously loaded virtual machine instance (e.g., by sending information for the virtual machine instance to the client device, receiving a connection request form the client device at the virtual machine, and then sending output data to the client device).

At block 415, processing logic receives a request from a second client device for access to the virtual machine. At block 418, processing logic authenticates the second client device (e.g., based on additional credentials provided by the second client device). The second client device may then be associated with the first user account or with a second user account.

At block 420, processing logic determines whether the first client device and the second client device have the same user (e.g., are associated with the same user account). This may be determined based on the credentials that were provided by the first client device and the second client device. For example, if the credentials from the first client device match credentials from the second client device, then it may be determined that they have the same user. In one embodiment (as shown), if the two client devices have the same user, the method continues to block 425. Otherwise, the method proceeds to block 435. Alternatively, processing logic may determine whether a sharing policy associated with the first user account permits sharing of the VM instance with a second user account associated with the second client device. For example, the sharing policy may permit sharing of VM instances with specific additional user accounts. If the second user account corresponds to one of the additional user accounts listed in the sharing policy, then the sharing policy may permit the second client device to connect to the VM instance. If the sharing policy does permit such sharing, then the method may continue to block 425 even though the second client device is associated with a different user account than the first client device.

At block 425, processing logic connects the second client device to the virtual machine instance. The second client device may be connected in a primary mode or in a secondary mode. Additionally, the first client device may have initially been connected in a primary mode. Processing logic may leave the first client device in the primary mode, or may convert it to a secondary mode. At block 440, processing logic disables one or more functions associated with the first client device. At block 445, processing logic enables one or more additional functions associated with the second client device. The disabled functions associated with the first client device may correspond to the enabled functions associated with the second client device. For example, if the first client device had a microphone client side resource that was being used by the virtual machine, processing logic may disable the microphone in the virtual machine, and may instead map a microphone client side resource from the second client device to the virtual machine.

At block 435, the connection fails. Processing logic may send a failure notice or fault to the second client device. The method then ends.

FIG. 5 is a flow diagram illustrating a method 500 for live migrating a running virtual machine instance between client devices. At block 505 of method 500, processing logic connects a first client device to a virtual machine in a primary or standard mode.

At block 510, processing logic receives a request from a second client device for access to the virtual machine. In one embodiment, the second client device includes a virtual machine client with automatic connection functionality. The virtual machine client may determine when to automatically send a request for connection to the virtual machine based on a location of the first client device or on other criteria. In one embodiment, the virtual machine client remains running on the second client device. The second client device may receive a signal from the first client device when a particular criterion is satisfied (e.g., when the first client device is within a certain proximity of the second client device). In response to receiving the signal, the virtual machine client may request access to the virtual machine without any user input. The second client device may include or be connected to a radio frequency identification (RFID) reader or a near field communication host, which may provide the signal from the first client device. Alternatively, or additionally, the second client device may include Bluetooth capabilities, and may have a pairing set up to the first client device. The second client device may receive the signal from the first client device via the Bluetooth pairing when the first client device enters Bluetooth range of the second client device. Alternatively, or additionally, the second client device may receive the signal via a network connection. For example, the first client device may include a global positioning system (GPS) receiver, and may determine that it is within a certain proximity of the second client device based on the GPS receiver. The first client device may then send a signal to the second client device via the network connection.

At block 515, processing logic connects the second client device to the virtual machine in a secondary mode in which the second client device does not provide keyboard or mouse commands to the virtual machine. At block 520, processing logic converts the second client device's connection to the primary mode from the secondary mode. The clients and host (or hypervisor and server) may transfer data to facilitate converting the second client device's connection to the primary mode. The data may be, for example, state data. At block 525, processing logic disconnects the first client device from the virtual machine. Thus, the virtual machine instance has been live migrated from the first client device to the second client device without any interruption.

FIG. 6 is a flow diagram illustrating a method 600 for managing a logical client that connects to two client devices. At block 605 of method 600, processing logic connects a first client device to a virtual machine instance. At block 610, processing logic connects a second client device to the virtual machine instance. At block 615, processing logic generates a single logical client associated with the first client device and the second client device. At block 620, processing logic presents the single logical client to the virtual machine instance.

At block 625, processing logic receives input from both client devices. At block 630, processing logic resolves any conflicts between the different inputs. For example, if processing logic received audio data from microphones of both client devices, processing logic may select the audio data from the first client device for forwarding to the virtual machine. At block 635, processing logic provides the resolved input data to the virtual machine as though the input data was generated by the single logical client.

At block 640, processing logic receives output data from the virtual machine at the logical client. At block 645, processing logic divides the output data into first output data and second output data. For example, the output data may include a file to be storage on a storage device, audio data and video data. Processing logic may determine that the file should be stored on a USB storage device attached to the first client device, and that the audio data and video data should be sent to both client devices. Accordingly, the first output data would include the file, the audio data and the video data. The second output data would include the audio data and the video data. At block 650, processing logic sends the first output data to the first client device and sends the second output data to the second client device. The method then ends.

Figure 7:
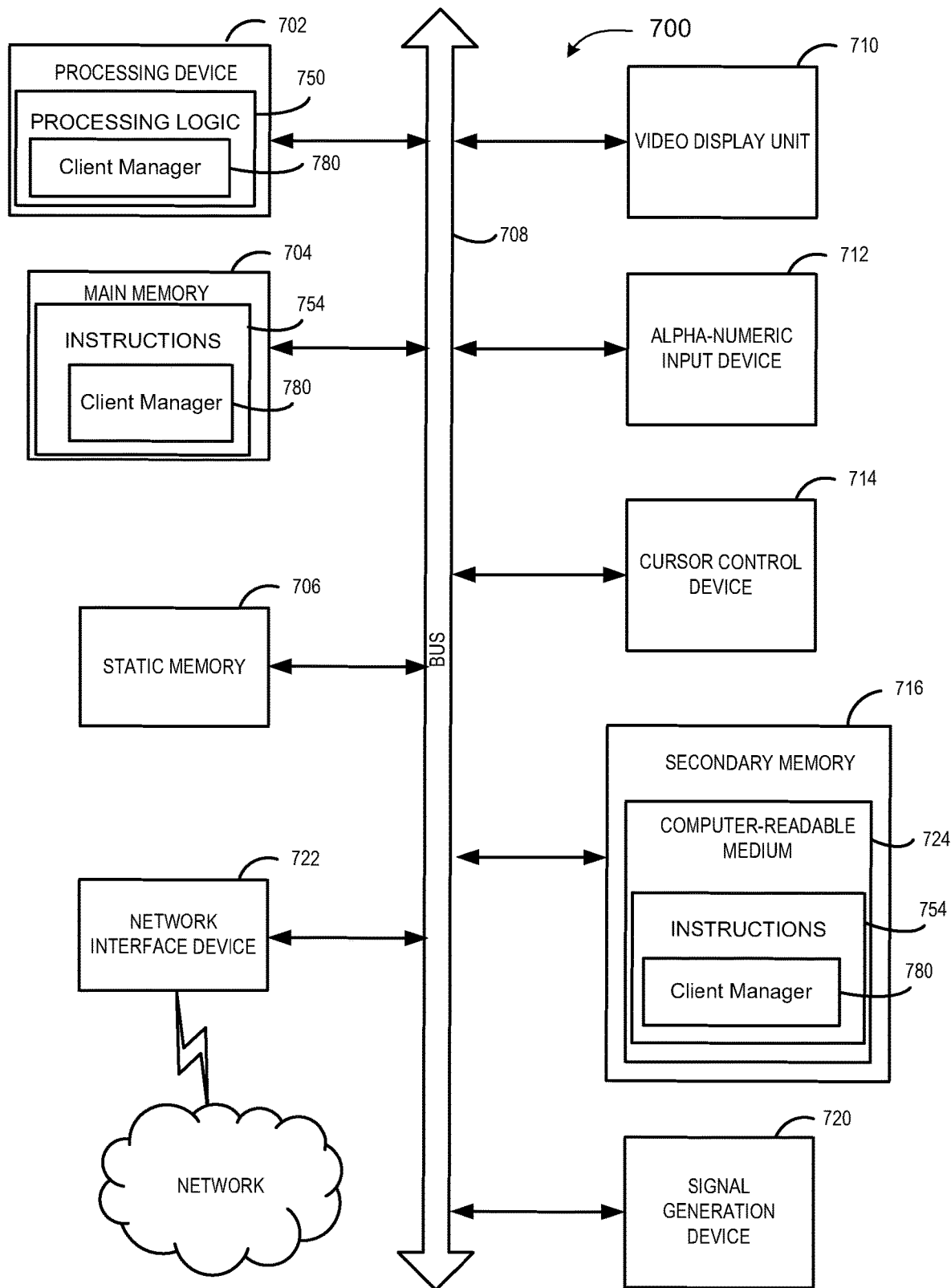
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. The computer system 700 may correspond to a host machine 125, a client device 105, 110 and/or virtualization controller 118 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 708.

The processing device 702 represents one or more general-purpose processors such as a microprocessor, central processing unit, or the like. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions 754 embodying any one or more of the methodologies or functions described herein (e.g., client manager 780, which may correspond to client manager 230 of FIG. 2). The instructions 754 may also reside, completely or at least partially, within the main memory 704 and/or within the processing device 702 during execution thereof by the computer system 700; the main memory 704 and the processing device 702 also constituting machine-readable storage media.

While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The computer system 700 may additionally include an interrupt programming module (not shown) for implementing the functionalities of the interrupt programmer. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "establishing", "connecting", "disabling", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method to manage a virtual machine instance that is associated with a first client device, the method comprising:
    connecting a second client device to a running virtual machine instance of a virtual machine while the first client device is connected to the running virtual machine instance;
    receiving, by a processing device, a first input data from the first client device and a second input data from the second client device;
    determining whether the second input data includes a greater number of commands than the first input data in a time period; and
    generating an output data associated with the running virtual machine instance by using the second input data in response to determining that the second input data includes a greater number of commands than the first input data in the time period.

2. The method of claim 1, running virtual machine instance corresponds to a virtual desktop.

3. The method of claim 1, further comprising:
    providing a notification of an address of the virtual machine to the second client device.

4. The method of claim 1, further comprising:
    determining whether to perform a rendering of graphics associated with the running virtual machine instance at the second client device or a host system providing the running virtual machine instance in view of a system load.

5. The method of claim 1, further comprising:
    disconnecting the first client device from the running virtual machine instance after connecting the second client device to the running virtual machine instance.

6. The method of claim 1, wherein the first or second input data corresponds to a keyboard input associated with the respective client device.

7. The method of claim 1, wherein the output data corresponds to audio and graphics associated with the running virtual machine instance.

8. A method to manage a virtual machine instance that is associated with a first client device, the method comprising:
    connecting a second client device to a running virtual machine instance of a virtual machine while the first client device is connected to the running virtual machine instance;
    receiving a first input data at the running virtual machine instance from the first client device and a second input data from the second client device; and
    selecting, by a processing device, the first input data or the second input data for the running virtual machine instance to generate an output data in view of a first quality of the first input data and a second quality of the second input data.

9. The method of claim 8, wherein the virtual machine instance corresponds to a virtual desktop.

10. The method of claim 8, further comprising:
    providing a notification of an address of the virtual machine to the second client device.

11. The method of claim 8, further comprising:
    determining whether to perform a rendering of graphics associated with the running virtual machine instance at the second client device or a host system providing the running virtual machine instance in view of a system load.

12. The method of claim 8, wherein the first or second input data corresponds to a keyboard input associated with the respective client device.

13. The method of claim 8, wherein the output data corresponds to audio and graphics associated with the running virtual machine instance.

14. A non-transitory computer readable medium comprising instructions to manage a virtual machine instance that is associated with a first client device; which when executed by a processing device, cause the processing device to:
    connect a second client device to a running virtual machine instance of a virtual machine while the first client device is connected to the running virtual machine instance;
    receive, by the processing device, a first input data from the first client device and a second input data from the second client device;
    determine whether the second input data includes a greater number of commands than the first input data in a time period; and
    generate an output data associated with the running virtual machine instance by using the second input data in response to determining that the second input data includes a greater number of commands than the first input data in the time period.

15. The non-transitory computer readable medium of claim 14, wherein the running virtual machine instance corresponds to a virtual desktop.

16. The non-transitory computer readable medium of claim 14, wherein the processing device is further to:
    provide a notification of an address of the virtual machine to the second client device.

17. The non-transitory compute readable medium of claim 14, wherein the processing device is further to:
    determine whether to perform a rendering of graphics associated with the running virtual machine instance at the second client device or a host system providing the running virtual machine instance in view of a system load.

18. The non-transitory computer readable medium of claim 14, wherein the processing device is further to:
disconnect the first client device from the running virtual machine instance after connecting the second client device to the running virtual machine instance.

19. The non-transitory computer readable medium of claim 14, wherein the first or second input data corresponds to a keyboard input associated with the respective client device.

20. The non-transitory computer readable medium of claim 14, wherein the output data corresponds to audio and graphics associated with the running virtual machine instance.

* * * * *